(12) United States Patent
Hilarius et al.

(10) Patent No.: US 6,348,259 B1
(45) Date of Patent: Feb. 19, 2002

(54) MODIFIED ELECTRODE MATERIAL AND ITS USE

(75) Inventors: Volker Hilarius; Gerhard Pfaff, both of Münster; Ralf Glausch, Darmstadt; Dietmar Rahner, Dresden; Waldfried Plieth, Ockerwitz; Matthias Kloss, Dresden, all of (DE)

(73) Assignee: Merck Patent Gesellschaft mit (DE)

( * ) Notice: Subject to any disclaimer, the term of this patent is extended or adjusted under 35 U.S.C. 154(b) by 0 days.

(21) Appl. No.: 09/269,536

(22) PCT Filed: Sep. 29, 1997

(86) PCT No.: PCT/EP97/05334

§ 371 Date: Mar. 30, 1999

§ 102(e) Date: Mar. 30, 1999

(87) PCT Pub. No.: WO98/15987

PCT Pub. Date: Apr. 16, 1998

(30) Foreign Application Priority Data

Oct. 10, 1996 (DE) .......................... 196 41 970
Jul. 4, 1997 (DE) .......................... 197 28 614

(51) Int. Cl.[7] .............................. B32B 5/16; H01M 4/50
(52) U.S. Cl. ...................... 428/323; 428/324; 428/328; 428/330; 429/224; 429/232
(58) Field of Search ................ 428/402, 403, 428/323, 324, 330, 328; 429/224, 232

(56) References Cited

U.S. PATENT DOCUMENTS

| | | | | |
|---|---|---|---|---|
| 3,883,368 A | * | 5/1975 | Kordesch et al. | 136/86 A |
| 3,945,847 A | * | 3/1976 | Kordesch et al. | 136/100 R |
| 4,028,215 A | * | 6/1977 | Lewis et al. | 204/290 F |
| 4,072,586 A | * | 2/1978 | De Nora et al. | 204/105 M |
| 4,221,853 A | | 9/1980 | Tye et al. | |
| 4,243,503 A | * | 1/1981 | Lieb et al. | 204/290 F |
| 4,405,699 A | | 9/1983 | Kruger | 429/224 |
| 4,422,917 A | * | 12/1983 | Hayfield | 204/196 |
| 4,451,543 A | * | 5/1984 | Dzieciuch et al. | 429/206 |
| 5,153,081 A | * | 10/1992 | Thackeray et al. | 429/194 |
| 5,156,934 A | | 10/1992 | Kainthia et al. | |
| 5,342,712 A | | 8/1994 | Mieczkowska et al. | |
| 5,419,986 A | * | 5/1995 | Kainthla et al. | 429/224 |
| 5,532,085 A | * | 7/1996 | Davis et al. | 429/224 |
| 5,599,644 A | | 2/1997 | Swierbut et al. | |
| 5,658,693 A | * | 8/1997 | Thackeray et al. | 429/224 |
| 5,674,644 A | * | 10/1997 | Nazri | 429/224 |
| 5,698,342 A | | 12/1997 | Klein | |
| 5,744,266 A | * | 4/1998 | Nunome et al. | 429/224 |
| 5,783,328 A | * | 7/1998 | Wang | 429/137 |

FOREIGN PATENT DOCUMENTS

| | | |
|---|---|---|
| DE | 19641970 | 4/1998 |
| EP | 0 747 982 | 11/1996 |
| EP | 0747982 | 12/1996 |
| FR | 2418965 | 9/1979 |
| JP | 57 090872 | 6/1982 |
| JP | 57090872 | 6/1982 |
| WO | 97 13285 | 4/1977 |
| WO | 9217910 | 10/1992 |
| WO | 92/17910 | 10/1992 |
| WO | 96/38866 | 12/1996 |
| WO | 9638866 | 12/1996 |
| WO | 97/13285 | 4/1997 |
| WO | 9713285 | 10/1997 |

OTHER PUBLICATIONS

Patent Abstracts of Japan, vol. 006, No. 173 (Sep. 07, 1982).
Patent Abstracts of Japan, vol. 006, No. 173 (E–129) Sep. 7, 1982.

* cited by examiner

*Primary Examiner*—Hoa T. Le
(74) *Attorney, Agent, or Firm*—Millen, White, Zelano & Branigan, P.C.

(57) ABSTRACT

The invention relates to novel manganese dioxide electrodes containing modified, electrochemically active manganese dioxide, a method for their production and their use in primary electrochemical cells. The manganese dioxide electrode contains coated or uncoated inorganic particles, in which the carrier particles consist of a material chosen from the group: mica, SiO2, Al2O3, ZrO2 and ZnO.

32 Claims, 3 Drawing Sheets

MODIFIED ELECTRODE MATERIAL AND ITS USE

The invention relates to novel manganese dioxide electrodes comprising modified, electrochemically active manganese dioxide, a method for producing said novel manganese dioxide electrodes, and also their use in primary electrochemical cells.

Typical constituents of an alkaline primary cell are a cathode consisting of manganese dioxide, an anode, preferably of zinc, an alkaline electrolyte and an electrolyte-permeable separator material.

The zinc electrode consists, as a rule, of large-area zinc powder and a gelling agent, for example carboxymethylcellulose, as stabilizer. Also known, however, are zinc powder electrodes pressed or sintered cold or hot with or without binder. In addition to amalgamated zinc anodes, mercury-free zinc anodes are being used to an increased extent.

The alkaline electrolyte generally consists of an aqueous potassium hydroxide solution. It may, however, also be solutions of other hydroxides, such as sodium hydroxide or lithium hydroxide solutions and also their mixtures.

The separator material situated between the electrodes has the purpose of electronically isolating the two electrodes.

An electrolyte comprising pyrolusite, a manganese dioxide having γ-structure, which has a very high electrochemical activity is frequently used as cathode material. To increase the electrical conductivity, carbon particles, soot particles or graphite particles are usually added to such manganese dioxide electrodes. Organic or inorganic additives are used as binders.

U.S. Pat. No. 5,342,712 describes cell discharge times prolonged by 5 to 15% at high and at medium discharge currents as a result of adding titanium dioxide having anatase structure to the active mass of the manganese dioxide cathode. At the same time, such cells have a cell voltage which is increased by about 60 mV during the discharge. At low discharge currents, however, a negative effect is exhibited. The mode of operation of the titanium dioxide of this structure is explained by an increased ion mobility in this material during the discharge and a reduction in the polarization associated therewith, which results in turn in a longer discharge time. This effect is not achieved, according to this publication, by adding titanium oxide having rutile structure.

U.S. Pat. No. 5,532,085 describes the addition of $CaWO_4$, $MgTiO_3$, $BaTiO_3$, $CaTiO_3$, $ZnMn_2O_4$ and $Bi_{12}TiO_{20}$ and combinations of these oxides to the manganese dioxide cathode. Under various discharge conditions, up to 10% longer discharge times were measured on primary cells as a result of these additives.

These known processes for prolonging the limited discharge time of primary electrochemical cells by adding titanium dioxide have, however, substantial disadvantages for large-scale industrial use. As already stated in connection with U.S. Pat. No. 5,342,712, good cell characteristics can be achieved by adding anatase $TiO_2$ only for high and medium discharge currents. At low discharge rates, this effect cannot be detected. Furthermore, the specified improvements can be achieved only by using high-purity titanium dioxide particles. The prolonged discharge times described in U.S. Pat. No. 5,532,085 are not clearly comprehensible.

SUMMARY OF THE INVENTION

The object of the present invention was therefore to provide manganese dioxide electrodes whose use in galvanic cells, electrochemical cells, in particular in primary cells result in products having improved properties, in particular having prolonged discharge times and increased cell voltages during the discharge, and to be specific, both at high and at low discharge rates. It was also the object to provide an inexpensive, readily performed process for producing these modified manganese dioxide electrodes.

The object is achieved by manganese dioxide electrodes which comprise inorganic particles. These particles may be either plain or coated inorganic particles. Suitable as plain inorganic particles are, in particular, mica particles. Surprisingly, it was found by experiments that by blending the manganese dioxide normally used as cathode material with commercially obtainable mica particles, a starting material is obtained for producing manganese dioxide electrodes from which cathodes can be produced which have considerably improved properties.

The present invention therefore relates also to a manganese dioxide electrode which contains mica.

In this connection, the generally known and commercially obtainable mica types can be used. In a particularly preferred embodiment of this invention, the mica is used in ground form, mica particles having certain particle sizes being present. Preferably, mica particles having a particle size of 5–50 μm are used. Obtainable commercially, for example, are various micas of certain particle sizes, such as, for example, the F-mica (Merck KGaA, Darmstadt) having a particle size of 5–25 μm, the M-mica (Merck KGaA, Darmstadt) having a particle size of <15 μm or also the N-mica (Merck KGaA, Darmstadt) having a particle size of 10–50 μm. It goes without saying, however, that micas can also be used which have not been previously subjected to a specific treatment.

The coated particles can be those whose support particles consist of a material selected from the group consisting of mica, $SiO_2$, $Al_2O_3$, $ZrO_2$ and ZnO. Single or multiple coatings of said particles can be built up of dielectric and, in particular, of ferroelectric, piezoelectric or pyroelectric substances. Such coatings may consist of titanates, stannates, tungstates, niobates or zirconates; in addition, however, silicate coatings are also possible, depending on the type of basic particle selected. Particles having coatings consisting of mixtures of said substances are also suitable. Suitable inorganic particles may also have coatings consisting of metal oxides from the group consisting of $Fe_2O_3$, NiO, CoO, $ZrO_2$, $SnO_2$, $TiO_2$, $Sb_2O_3$, PbO, $Pb_3O_4$ or $Bi_2O_3$ and mixtures of the latter. The single coatings consisting per se of one substance may be doped with foreign ions, such as, for example, $SnO_2$ coatings doped with foreign ions.

The manganese dioxide used as basic material can be present in a structure comprising water of crystallization.

The abovementioned object is achieved, in particular, by manganese dioxide electrodes which comprise coated inorganic particles in an amount of 0.01 to 20% by weight, relative to the amount of manganese dioxide comprised in the electrode.

The manganese dioxide electrodes are produced by
a) homogenizing the manganese dioxide powder with an inorganic powder consisting of plain or singly or multiply coated inorganic particles,
b) optionally blending the mixture with an organic or inorganic binder and a conductive additive (preferably graphite), and
c) making the product obtained into an electrode.

The invention likewise relates to this production process.

Manganese dioxide electrodes according to the invention can be used to produce galvanic cells, electrochemical cells, primary batteries and in the latter case, 8 button-cell batteries, in particular.

Surprisingly, it was found by experiments that, as a result of blending the manganese dioxide conventionally used as cathode material with inorganic coated particles, so-called pearlescent pigments, obtainable commercially, a starting material is obtained for the production of manganese dioxide electrodes from which cathodes can be produced which have substantially improved properties. These pigments are inorganic particles which may be coated with a very wide variety of substances.

The experiments performed have shown that cathodes having prolonged discharge times are obtained by adding plain inorganic particles, such as, for example, mica, or inorganic coated particles if such inorganic particles are added in the form of mica or of coated mica particles, $SiO_2$ particles, $Al_2O_3$ particles, $ZrO_2$ particles or coated ZnO particles to the manganese dioxide in an amount of 0.01 to 20% by weight, relative to the amount of manganese dioxide. The amount added in each case depends on the intended use of the manganese dioxide electrodes produced. Whereas the addition of even minor amounts of about 0.01% by weight of the abovementioned particles exerts an appreciable effect on the discharge times of commercial batteries, additions of up to 20% by weight to cathode materials of button-cell batteries may be expedient.

The modification of the cathode material with plain inorganic particles, such as mica, achieves a marked increase in the capacity of the electrochemical cell compared with commercially available zinc/manganese oxide batteries whose cathodes are unmodified.

In particular, the modification with inorganic coated particles achieves an increase in the capacity of the electrochemical cell of 10 to 30% compared with commercially available zinc/manganese oxide batteries whose cathodes are unmodified. An increase in capacity of 30% can be achieved, in particular, by adding 20% by weight of inorganic coated particles to the manganese dioxide used.

Accordingly, it may be expedient to vary the amount of particles added depending on the type of particles and the use of the electrodes.

Plain inorganic particles which have proved useful for modifying the manganese dioxide used for producing electrodes are commercially available mica particles, which have already been described above.

Commercially available, coated inorganic particles comprising mica as support material have proved particularly suitable for modifying the manganese dioxide used to produce electrodes. Such materials are:

mica coated with titanium dioxide in anatase or rutile modification mica coated with $SiO_2$ and/or $SnO_2$ and/or $TiO_2$, mica coated with alkaline-earth titanates, alkali-metal titanates (Mg, Ca, Sr, Ba titanates) and/or lead titanate mica coated with stannates, tungstates, niobates or zirconates mica coated with metal oxides ($Fe_2O_3$, NiO, CoO, $ZrO_2$, $SnO_2$, $Sb_2O_3$, PbO, $Pb_3O_4$ or $Bi_2O_3$)

mica coated with $ZrO_2$ mica coated with mixtures of said oxides and titanates.

Also suitable, however, for the modification are those inorganic particles which are coated in the same way and in which $SiO_2$ particles, $Al_2O_3$ particles, $ZrO_2$ particles serve as support material. Good effects are achieved with the aid of particulate materials whose support materials can already be polarized per se, which is not, however, a requirement since improved capacities are also measured with materials whose support particles do not have these properties. It has proved particularly advantageous, however, if the coatings consist of dielectric substances, in particular of ferroelectric, piezoelectric or pyroelectric substances, such as, for example, titanates, stannates, zirconates, tungstates, niobates or others.

Surprisingly, it was found in experiments that the use of particles according to the invention having titanium dioxide coatings results, in contrast to that in U.S. Pat. No. 5,342,712, in an appreciable increase in the capacity of the experimental cell, regardless of whether the coating has an anatase structure or a rutile structure. It has also been found that the advantageous result is achieved without high-purity starting substances being used for the modification. Equally good results are achieved if particles whose surfaces are coated with metal oxides from the group consisting of $Fe_2O_3$, NiO, CoO, $ZrO_2$, $SnO_2$, $TiO_2$, $Sb_2O_3$, PbO, $Pb_3O_4$, $Bi_2O_3$, $WO_3$, NbO or with mixtures of said metal oxides are used to modify the electrode material. Surprisingly good capacity increases are achieved by adding particles whose surface coatings are doped with foreign ions, such as, for example, $SnO_2$ coatings doped with antimony.

To produce the actual cathode material, the manganese dioxide powder is blended with the desired amount of particulate powder and homogenized in a manner known to the person skilled in the art. The homogenization can be performed by grinding in ball mills or attrition mills. In the experiments performed, grinding with ball mills for about eight hours and longer has proved beneficial. The product homogenized in this way can then be blended with further additives, such as, for example, with organic or inorganic binders and conductivity additives. PTFE, latex and other binders known to the person skilled in the art for this purpose can be added as organic binders. Portland cement may serve as inorganic binder. Particularly suitable is PTFE. Suitable conductivity additives are soot, graphite, steel wool and other conductive fibres. Particularly good results were achieved by adding soot and graphite in an amount of 4–10, in particular of about 5% by weight, relative to the total amount.

The powder blended with all the additives is then made into electrodes in a manner known per se. This can be done by pressing at very high pressure between wire fabrics consisting of an inert material, such as, for example, nickel. Optionally, this can be followed by a treatment at elevated temperature, a so-called annealing.

Electrodes produced in this way can be used in a known manner to produce primary galvanic cells in which a zinc electrode conventionally serves as counter-electrode in the presence of an alkaline electrolyte. Other designs of suitable galvanic cells are, however, also possible. Thus, the viscosity of the per se aqueous electrolyte can be increased by various additives, such as, for example, gelling agents, silica gel or others. A suitable polymer fabric or polymer nonwoven material can be provided as separating material between the electrodes and a spacer can be inserted if this should be necessary. Materials consisting of PVA, polypropylene or other inert polymers may serve as polymer nonwoven materials. Spacers such as those known from commercially obtainable batteries can have a corrugated form or consist, for example, of PVC.

For experimental purposes, electrodes were produced from the manganese dioxide mixtures according to the invention by adding, after the grinding, a conductivity additive and a binder in each case. The mixture thus obtained was pressed between two nickel-wire gauzes to form cathodes.

Examples are given below for the purpose of illustration and for the easier understanding of the present invention which do not serve, however, to restrict the actual invention.

EXAMPLES

Example 1
Production of a comparison electrode

To produce a manganese dioxide electrode, 30 mg of manganese dioxide (EMD-TRF*), 150 mg of graphite (Lonza KS 75) and 10 mg of PTFE powder are homogenized in a mortar. The powder mixture obtained is pressed between two nickel gauzes using a pressure of 30 kN/cm$^2$ to produce an electrode tablet having a diameter of 16 mm and a thickness of 1.2 mm. This manganese dioxide electrode is fitted together with a zinc counterelectrode into a button cell of the size 2032. One layer each of propylene nonwoven fabric FS 2123 WI (supplied by Freudenberg) and Celgard 2500 (supplied by Hoechst) serve as separators. In addition, a PVC corrugated separator is used as spacer. KOH (9 mol/l) serves as electrolyte. The cell is discharged at a specific discharge current density of 20 mA/g of MnO$_2$.

Example 2

9.0 g of manganese dioxide (EMD-TRF) and 1.0 g of a mica coated with tin dioxide and titanium dioxide, the latter being crystallized in a rutile structure, are ground together in a ball mill for eight hours. The modified pyrolusite thus obtained is tested in a discharge experiment.

For this purpose, a depolarizer mixture is produced from:

33.4 mg of modified manganese dioxide
150 mg of graphite (Lonza KS 75)
10 mg of PTFE powder.

This mixture is homogenized in a mortar and pressed between two nickel gauzes with a compression force of 30 kN/cm$^2$ to form an electrode tablet having a diameter of 16 mm and a thickness of approximately 1.2 mm. The total content of modified mica in the positive electrode is 1.7%, relative to the mass. This electrode is used, together with a zinc electrode, as counterelectrode in a button cell of size 2032. One layer each of propylene nonwoven material FS 2123 (supplied by Freudenberg) and Celgard 2500 (supplied by Hoechst) serve as separators. In addition, a PVC corrugated separator is used as spacer. A KOH solution (9 mol/l) serves as electrolyte.

The specific discharge current density is 20 mA/g of MnO$_2$.

Example 3

9.0 g of manganese dioxide (EMD-TRF) and 1.0 g of mica which is multiply coated with titanium dioxide, silicon dioxide and antimony-doped tin oxide (Minatec® 30 CM, supplied by Merck, Darmstadt) are ground together in a ball mill for 8 hours. The modified manganese dioxide thus obtained is tested in a cycling experiment.

For this purpose, a depolarizer mixture is produced from:

33.4 mg of modified manganese dioxide
150.0 mg of graphite (Lonza KS 75)
10.0 mg of PTFE powder.

This mixture is homogenized in a mortar and pressed between two nickel gauzes at a compression pressure of 30 kN/cm$^2$ to produce an electrode tablet having a diameter of 16 mm and a thickness of approximately 1.2 mm. The total content of modified mica in the positive electrode is 1.7%, relative to the mass. This electrode is used, together with a cadmium electrode, as counterelectrode in a button cell of size 2032. One layer each of propylene nonwoven material FS 2123 WI (supplied by Freudenberg) and Celgard 2500 (supplied by Hoechst) serve as separators. In addition, a PVC corrugated separator is used as spacer. A KOH solution (9 mol/l) serves as electrolyte. The specific discharge current density is 20 mA/g of MnO$_2$.

Example 4

Analogously to Example 2 however, a mica coated with titanium dioxide with anatase structure was used to modify the manganese dioxide.

TABLE 1

Results of the discharge experiments as a function of the final discharge voltage

| | Discharge time [h] | | |
|---|---|---|---|
| Experiment No. | 1.0 V | 0.9 V | 0.8 V |
| 1 | 9.5 | 11.8 | 12.8 |
| 2 | 11.7 | 13.2 | 15.7 |
| 3 | 10.2 | 12.4 | 13.7 |
| 4 | 10.9 | 13.4 | 16.4 |

As a result of adding titanium-dioxide-coated support materials to the manganese dioxide active mass, the discharge time as a function of the final discharge voltage has been prolonged by 7 to 23% compared with the comparison cell.

TABLE 2

Discharge experiments with a discharge current density of 100 mA/g of MnO$_2$

| Experiment No. | Discharge time [h] | | |
|---|---|---|---|
| | 1.0 V | 0.9 V | 0.8 V |
| 1 | 2.03 | 2.14 | 2.24 |
| 2 | — | — | — |
| 3 | 2.07 | 2.20 | 2.24 |
| 4 | 2.10 | 2.24 | 3.05 |

Examples 5 to 7

An alkaline round cell is produced by a standard technology such as is conventional in the mass production of these batteries. As an example, the following sizes are selected: size "C" or IEC LR 14 and size "AA" or IEC LR 6. The following are used to produce these batteries:

- a conventional mercury-free zinc electrode as anode (<50 ppm of Hg) (gel electrode) produced from mercury-free zinc powder and polyacrylate
- a KOH electrolyte solution (7 to 9 molar) with standard production additives
- a conventional electrolyte-permeable separator diaphragm (same material as in Example 1)
- and a manganese dioxide electrode consisting of 90% electrolytically produced manganese dioxide (EMD), 8% graphite powder and 2% PTFE as binder. To produce this electrode, the powdered starting materials are mixed, granulated and pressed to form a hollow-cylindrical cathode moulded body. Said moulded body is assembled, together with the other components, to form a cell. In this connection, the dimensions of the cathode moulded bodies are, for size AA:
  height 11 mm
  wall thickness 2.2 mm
  external diameter 12.2 mm of which 4 moulded bodies are inserted in suitably dimensioned nickel-plated steel containers.

To produce cells of size "C", suitable cathode moulded bodies are produced which have the dimensions:
  height 11 mm
  wall thickness 3.8 mm
  external diameter 24 mm,
of which 4 moulded bodies are fitted per cell.

Example 5
(reference)
The cell is assembled as described above.

Example 6

The manganese dioxide electrode of the cell comprises, in addition to the constituents already described, also a) 0.1 or b) 0.2 or c) 0.5% of a mica powder coated with titanium dioxide having anatase structure.

Example 7

The manganese dioxide electrode comprises, in addition to the components described in Example 5, also a) 0.1 or b) 0.2 or c) 0.5% of a mica powder coated with SnO$_2$ and titanium dioxide with rutile modification.

The freshly produced cells are measured in accordance with IEC and ANSI standard conditions.

TABLE 3

| Example No. | Additive | Size | Measurement conditions | Battery capacity achieved |
|---|---|---|---|---|
| 5 | | AA | 3.9 Ω cont. (0.75 V) | 1.77 Ah |
| 6a | 0.2% mica, coated with TiO$_2$ with anatase structure | AA | 3.9 Ω cont. (0.75 V) | 1.87 Ah |
| 7a | 0.2% mica, coated with TiO$_2$ with rutile structure | AA | 3.9 Ω cont. (0.75 V) | 1.80 Ah |
| 5 | | AA | 1.8 Ω 15 s pulse (0.9 V) | 560 pulses |
| 6a' | 0.2% mica, coated with TiO$_2$ with anatase structure | AA | 1.8 Ω 15 s pulse (0.9 V) | 597 pulses |
| 7a' | 0.2% mica, coated with TiO$_2$ with rutile structure | AA | 1.8 Ω 15 s pulse (0.9 V) | 582 pulses |
| 5 | | C | 2 Ω cont. (0.9 V) | 8.30 Ah |
| 6b | 0.1% mica, coated with TiO$_2$ with anatase structure | C | 2 Ω cont. (0.9 V) | 8.82 Ah |
| 7b | 0.1% mica, coated with TiO$_2$ with rutile structure | C | 2 Ω cont. (0.9 V) | 8.66 Ah |
| 5 | | C | 2 Ω cont. (0.9 V) | 8.30 Ah |
| 6c | 0.5% mica, coated with TiO$_2$ with anatase structure | C | 2 Ω cont. (0.9 V) | 8.49 Ah |
| 7c | 0.5% mica, coated with TiO$_2$ with rutile structure | C | 2 Ω cont. (0.9 V) | 8.45 Ah |

Example 8

9.9 g of manganese dioxide (EMD-TRF) and 0.1 g of mica (F-mica supplied by Merck KGaA) are ground together in a ball mill for eight hours. The modified pyrolusite thus obtained is tested in a discharge experiment.

The electrode mass produced for this purpose is composed of 20% manganese dioxide (EMD-TRF), 75% graphite (Lonza KS75) and 5% polytetrafluoroethylene (PTFE). The components are homogenized in mortar and the PTFE binder is added as an approximately 63%-strength aqueous suspension. The moist mixture obtained is pasted onto a nickel gauze having an area of 1 cm$^2$ so that an approximately 0.5 mm thick electrode is obtained. The discharge experiment is carried out in a model cell having a platinum counterelectrode and Hg/HgO/KOH (9 mol/l) reference electrode. An aqueous potassium hydroxide solution (9 mol/l) serves as electrolyte. The specific discharge current density is 4 mA/g of MnO$_2$.

Example 9

After producing an MnO$_2$ electrode in accordance with Example 8, the latter is discharged in a model cell at a specific discharge current density of 20 mA/g of MnO$_2$.

Example 10

After producing an $MnO_2$ electrode in accordance with Example 1, said electrode, which does not contain any additives, is discharged in a model cell at a specific discharge current density of 20 mA/g of $MnO_2$.

Example 11

9.5 g of manganese dioxide (EMD-TRF) and 0.5 g of mica (F-mica supplied by Merck KGaA) are ground together in a ball mill for eight hours. The physically modified pyrolusite thus obtained is tested in a discharge experiment.

The depolarizer mixture produced for this purpose is composed of 30 mg of modified manganese dioxide, 150 mg of Lonza graphite KS75 and 10 mg of PTFE powder. This mixture is homogenized in a mortar and pressed between two nickel gauzes with a compression force of 30 $kN/cm^2$ to form an electrode tablet having a diameter of 16 mm and a thickness of approximately 1 mm. This positive electrode is used, together with a zinc electrode, as counterelectrode in a button cell of size 2032. One layer each of polypropylene nonwoven fabric FS 2123WI (supplied by Freudenberg) and Celgard 2500 (supplied by Hoechst) serve as separators. In addition, a PVC corrugated separator is used as spacer. A KOH solution (9 mol/1) serves as electrolyte. The specific discharge current density is 20 mA/g of $MnO_2$.

Example 12
(Comparison measurement)

A depolarizer mixture is produced from 30 mg of manganese dioxide (EMD-TRF), 150 mg of Lonza graphite KS75 and 10 mg of PTFE powder. This mixture is homogenized in a mortar and pressed between two nickel gauzes with a compression force of 30 $kN/cm^2$ to form an electrode tablet having a diameter of 16 mm and a thickness of approximately 1 mm. This positive electrode is used, together with a zinc electrode, as counterelectrode in a button cell of size 2032. One layer each of polypropylene nonwoven fabric FS 2123WI (supplied by Freudenberg) and Celgard 2500 (supplied by Hoechst) serve as separators. In addition, a PVC corrugated separator is used as spacer. A KOH solution (9 mol/l) serves as electrolyte.

The specific discharge current density is 20 mA/g of $MnO_2$.

DESCRIPTION OF THE DRAWINGS

The results of the discharge experiments are shown in the figures below.

FIG. 1 shows the discharge behaviour of two electrodes which were produced in accordance with Example 8 and of a comparison electrode without additive in accordance with Example 1. In each case, the electrode potential is shown against the amount of charge drawn. The discharge took place at a specific current density of 4 mA/g of $MnO_2$.

FIG. 2 shows the discharge behaviour of two electrodes which were produced in accordance with Example 9 and of a comparison electrode without additive in accordance with Example 10. Shown in each case is the electrode potential against the amount of charge drawn. The discharge took place at a specific current density of 20 mA/g of $Mn_2$.

FIG. 3 shows the discharge behaviour of an electrode produced in accordance with Example 11 and of a comparison electrode in accordance with Example 12. The cell voltage is shown against the amount of charge drawn. The discharge took place at a specific current density of 20 mA/g of $MnO_2$.

Figure 1:
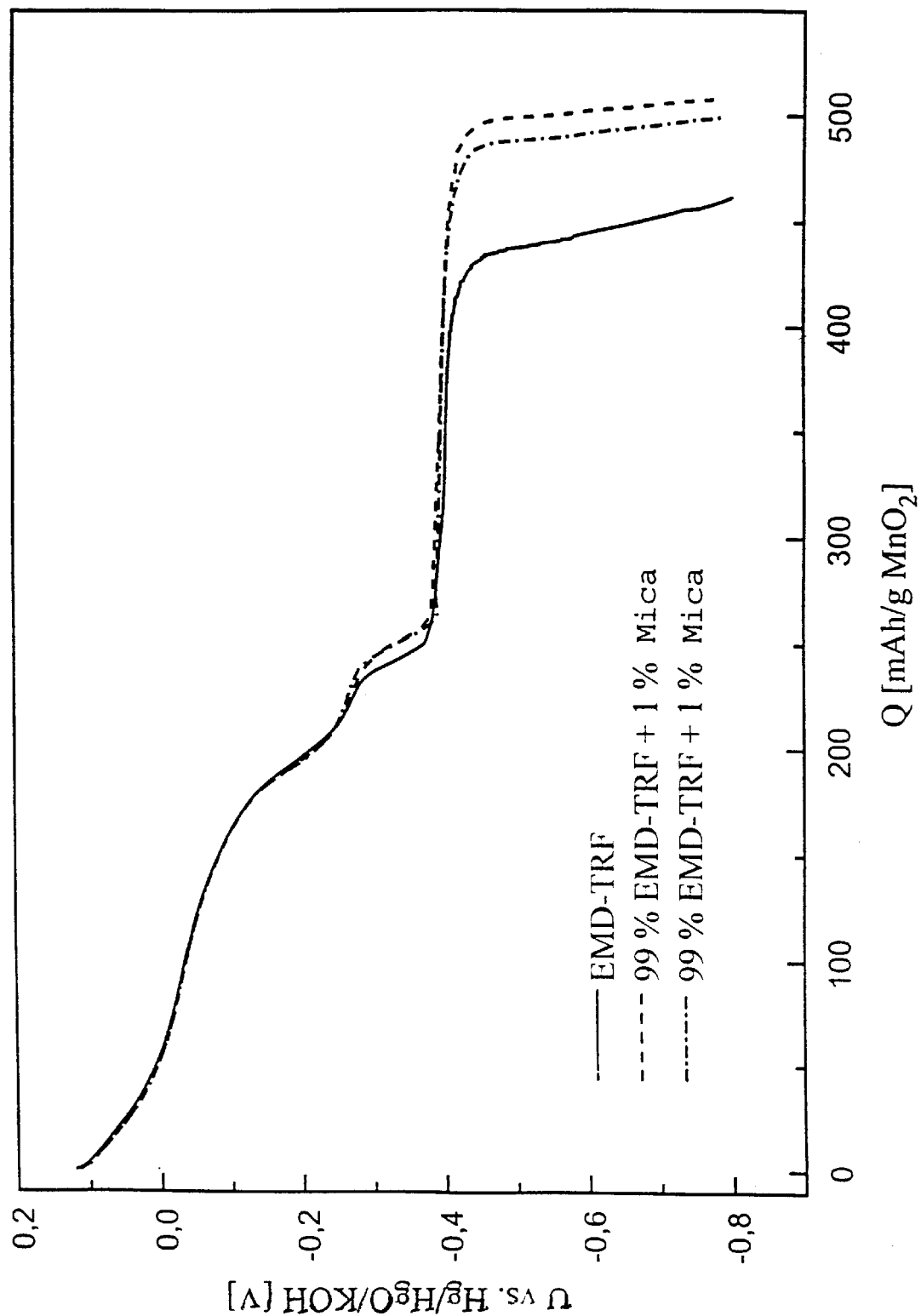
FIG. 1
Figure 2:
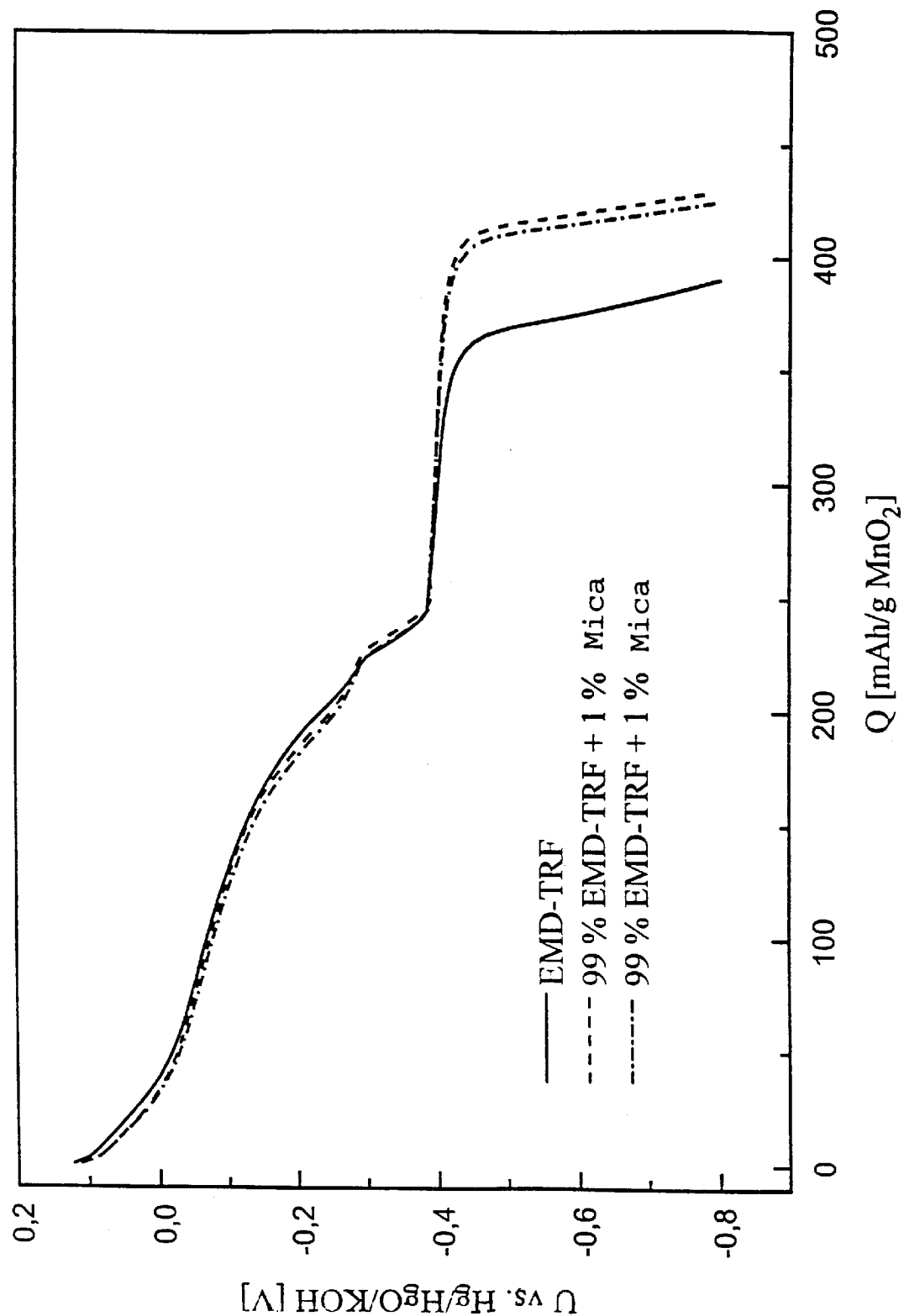
FIG. 2
Figure 3:
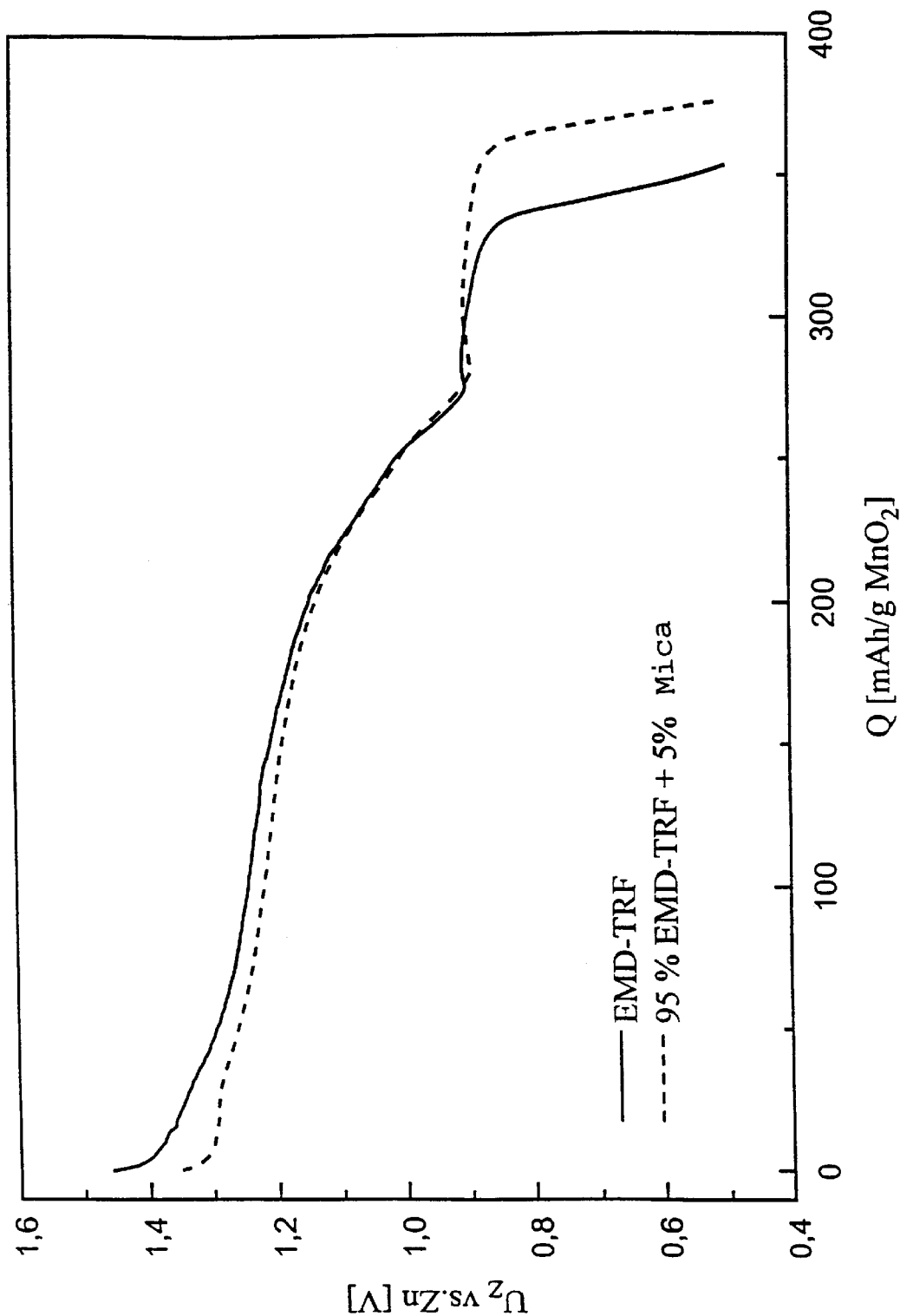
FIG. 3

What is claimed is:

1. A manganese dioxide electrode comprising coated inorganic particles.

2. A manganese dioxide electrode according to claim 1, further comprising coated mica, $SiO_2$, $Al_2O_3$, $ZrO_2$ and ZnO.

3. A manganese dioxide electrode according to claim 1, wherein the coated inorganic particles comprised therein have single or multiple coatings of dielectric substances.

4. A manganese dioxide electrode according to one of claim 1, wherein the coated inorganic particles comprised therein have single or multiple coatings of ferroelectric, piezoelectric or pyroelectric substances.

5. A manganese dioxide electrode according to claim 1, wherein the coated inorganic comprised therein have single or multiple coatings of titanates, stannates, zirconates, tungstates, niobates, silicates or of mixtures thereof, with the proviso that in the case of multiple coatings, the individual layers can be identical or different.

6. A manganese dioxide electrode according to one of claim 1, wherein the coated inorganic particles comprised therein have coatings consisting of titanium dioxide with anatase or rutile modification.

7. A manganese dioxide electrode according to claim 1, wherein the coated inorganic particles comprised therein have coatings of metal oxides of $Fe_2O_3$, NiO, CoO, $ZrO_2$, $SnO_2$, $TiO_2$, $Sb_2O_3$, PbO, $Pb_3O_4$, $Bi_2O_3$, $WO_3$, NbO or mixtures thereof.

8. A manganese dioxide electrode according to claim 1, wherein the coatings of the coated inorganic particles comprised therein maybe doped with foreign ions.

9. A manganese dioxide electrode according to claim 1, wherein the coated coated inorganic particles comprised therein have at least one coating of $SnO_2$ which is doped with antimony ions.

10. A manganese dioxide electrode according to claim 1, wherein the manganese dioxide comprised therein is present in a structure comprising water of crystallization.

11. A manganese dioxide electrode according to claim 1, comprising 0.01 to 15% by weight of inorganic coated particles, relative to the amount of manganese dioxide.

12. A process for producing a manganese dioxide electrode, comprising:
   a) homogenizing a manganese dioxide powder with coated silicate, silica, and/or metal oxide particles,
   b) optionally blending the mixture with an organic or inorganic binder and a conduction additive and
   c) manufacturing the product into an electrode.

13. A process according to claim 12, wherein the manganese dioxide powder is homogenized with coated silicate, silica, and/or metal oxide particles by grinding.

14. A process according to claim 13, wherein the homogenized powder mixture is made into an electrode by pressing, optionally between two support materials, and also optionally by annealing.

15. A manganese dioxide electrode comprising coated silicate, silica, and/or metal oxide particles.

16. A manganese dioxide electrode according to claim 15 wherein the coated metal oxide particles are comprised of mica, $SiO_2$, $Al_2O_3$, $ZrO_2$ or ZnO.

17. A manganese dioxide electrode according to claim 15 wherein the particles have coatings of dielectric substances.

18. A manganese dioxide electrode according to claim 15 wherein the particles have single or multiple coatings of ferroelectric, piezoelectric, or pyroelectric substances.

19. A manganese dioxide electrode according to claim 15 wherein the particles have single or multiple coatings of at least one of titanates, stannates, zirconates, tungstates, niobates, silicates or of mixtures thereof, with the proviso that in the case of multiple coatings, the individual layers can be identical or different.

20. A manganese dioxide electrode according to claim 15 wherein the particles have coatings of titanium dioxide with anatase or rutile modification.

21. A manganese dioxide electrode according to claim 15 wherein the particles have coatings of metal oxides of $Fe_2O_3$, NiO, CoO, $ZrO_2$, $SnO_2$, $TiO_2$, $Sb_2O_3$, PbO, $Pb_3O_4$, $Bi_2O_3$, $WO_3$, NbO or mixtures thereof.

22. A manganese dioxide electrode according to claim 15 wherein the particles have at least one coating of $SnO_2$ which is doped with antimony ions.

23. A galvanic cell comprising a manganese dioxide electrode according to claim 15.

24. An electrochemical cell comprising a manganese dioxide electrode according to claim 15.

25. A prismatic or round cell comprising a manganese dioxide electrode according to claim 15.

26. A button-cell battery comprising a manganese dioxide electrode according to claim 15.

27. A manganese dioxide electrode according to claim 15 wherein the coatings of the particles comprised therein maybe doped with foreign ions.

28. A manganese dioxide electrode according to claim 15 wherein the particles further comprising manganese dioxide present in a structure comprising water of crystallization.

29. A manganese dioxide electrode according to claim 15 comprising coated silicate particles.

30. A manganese dioxide electrode comprising mica or $ZrO_2$ particles.

31. A manganese dioxide electrode according to claim 30 wherein the mica or $ZrO_2$ particles are uncoated.

32. A manganese dioxide electrode according to claim 30 wherein the manganese dioxide electrode comprises uncoated mica particles.

* * * * *

UNITED STATES PATENT AND TRADEMARK OFFICE
CERTIFICATE OF CORRECTION

| | | |
|---|---|---|
| PATENT NO. | : 6,348,259 B1 | Page 1 of 1 |
| APPLICATION NO. | : 09/269536 | |
| DATED | : February 19, 2002 | |
| INVENTOR(S) | : Hilarius et al. | |

It is certified that error appears in the above-identified patent and that said Letters Patent is hereby corrected as shown below:

Column 10, line 51 reads "15% by weight" should read -- 20% by weight --

Signed and Sealed this

Twenty-second Day of August, 2006

JON W. DUDAS
*Director of the United States Patent and Trademark Office*